United States Patent [19]
Clark

[11] 4,230,222
[45] Oct. 28, 1980

[54] GRAIN CONVEYOR ASSEMBLY

[76] Inventor: Philip G. Clark, 726 Ash Rd., Worthington, Minn. 56187

[21] Appl. No.: 5,478

[22] Filed: Jan. 22, 1979

[51] Int. Cl.³ ............................................. B65G 37/00
[52] U.S. Cl. ................................... 198/580; 198/494; 198/816
[58] Field of Search ............... 198/816, 824, 860, 861, 198/494, 497, 498, 580, 823

[56] References Cited

U.S. PATENT DOCUMENTS

| | | | |
|---|---|---|---|
| 857,370 | 6/1907 | Waechter | 198/824 |
| 1,659,316 | 2/1928 | Enney | 198/824 |
| 2,488,671 | 11/1949 | Lehman | 198/494 |
| 2,886,169 | 5/1959 | Calder | 198/498 |
| 3,055,229 | 9/1962 | Mecham | 198/494 |
| 3,581,878 | 6/1971 | Jacobson | 198/823 |
| 3,809,211 | 5/1974 | Padilla | 198/580 |

FOREIGN PATENT DOCUMENTS 1499105  1/1978  United Kingdom ..................... 198/823

Primary Examiner—Joseph E. Valenza
Attorney, Agent, or Firm—Brud, Bartz & Gutenkauf

[57] ABSTRACT

A conveyor assembly for moving particulate material such as grain on a conveyor belt. The conveyor assembly includes a tail section, one or more intermediate sections according to the needed length, and a head section. The head section contains a powered drive pulley. The tail section contains a tail pulley. An endless conveyor belt is trained between the tail pulley and the drive pulley. Each intermediate section carries at least one roller for carrying the forward run of the conveyor belt. The intermediate section rollers have a contoured, concave surface to support the conveyor belt with a dish-shaped or concave profile such that material is held on the conveyor belt and inhibited from spilling over the sides. The tail pulley is mounted in a tail pulley shroud having a funnel-shaped outlet directed toward the forward run of the conveyor belt. The tail pulley has paddles which are operative to sweep up spilled material in the tail sections and move it around the shroud housing through the outlet to discharge it back onto the forward run of the conveyor belt. The longitudinal position of the tail pulley is adjustable in order to set the tension in the conveyor belt.

10 Claims, 15 Drawing Figures

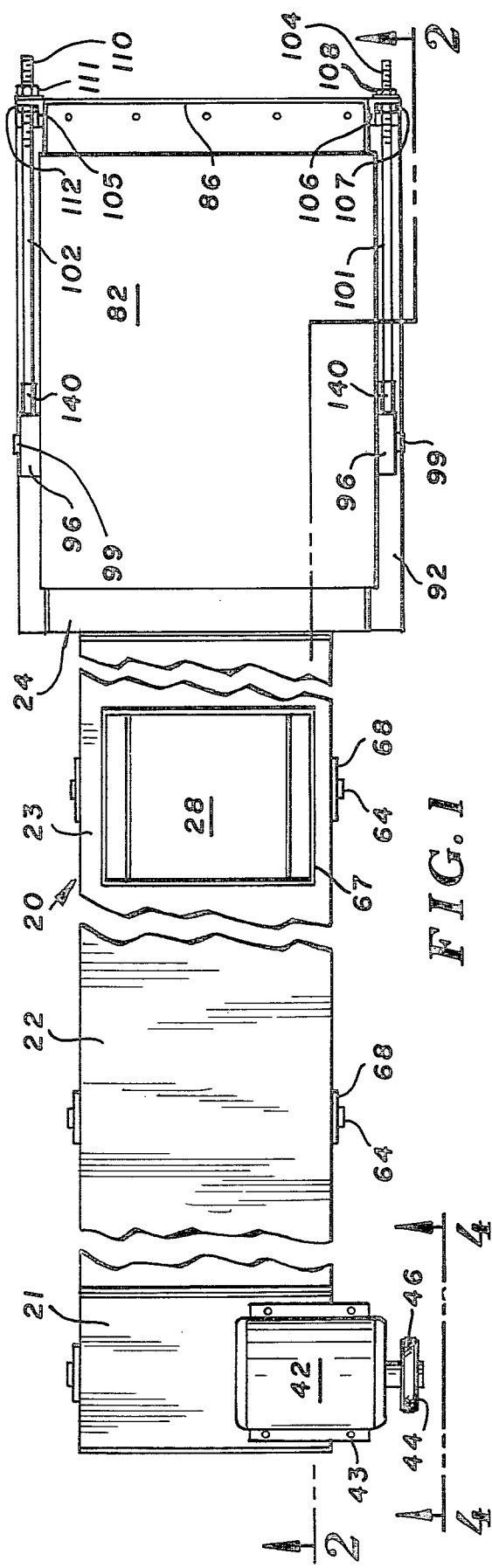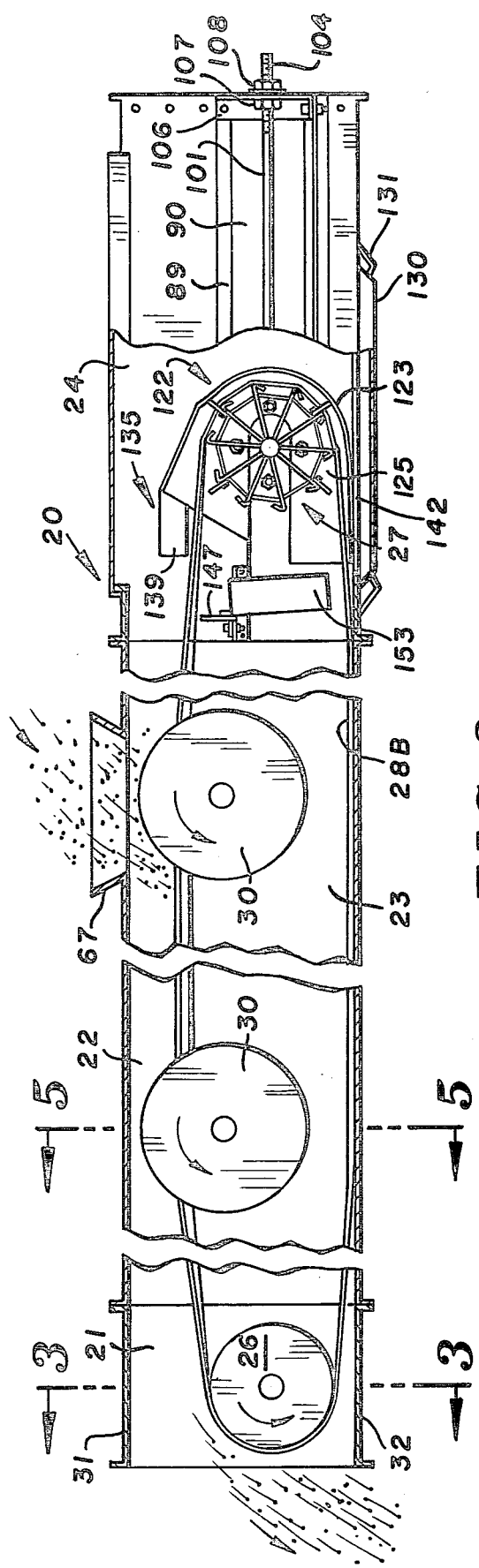

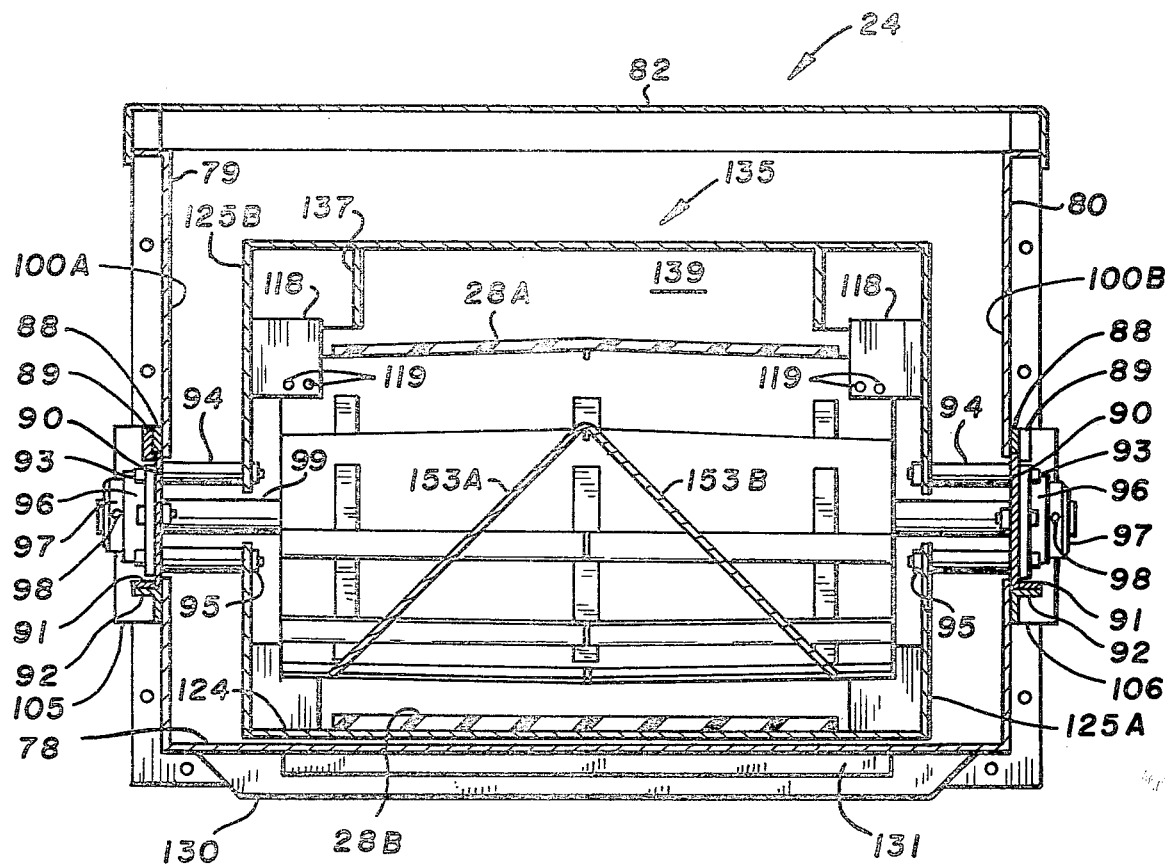
FIG.13
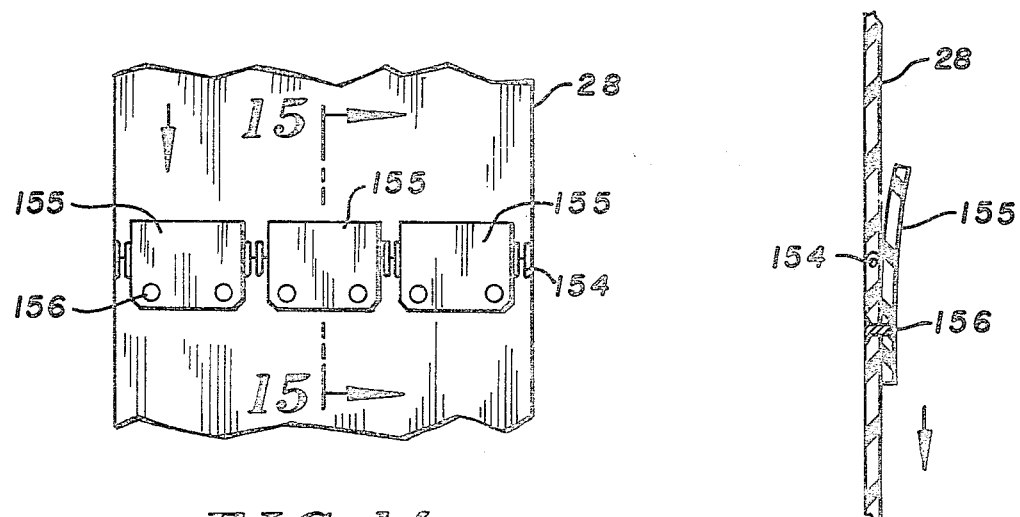
FIG.14
FIG.15

GRAIN CONVEYOR ASSEMBLY

SUMMARY OF THE INVENTION

Grain conveyor assemblies are used to move grain from one location to another such as a grain drying station to a grain elevator or from an elevator to a barge for transport. Belt conveyors typically have endless conveyor belts that carry grain on the upper surface of the forward conveyor belt run. The belt typically rides on sets of rollers, each set having laterally spaced apart rollers orientated in a V-configuration such that the belt assumes a trough shape to contain the grain or other particulate material. Conveyor belts are a favored method of moving grain as they do not injure the grain as, for example, an auger might. Open conveyor belts are subject to dust and weather problems and permit the emission of a certain amount of grain dust into the environment.

The present invention relates to an improved grain conveyor assembly. The conveyor includes a reloading tail section, one or more intermediate sections according to the needed length, and a head section. The head section contains the powered drive pulley. The tail section contains the idler roller or tail pulley. An endless conveyor belt is trained between the tail pulley and the drive pulley. Each intermediate section of the conveyor carries at least one roller for carrying the forward run of the conveyor belt. Each roller is mounted on a shaft extending horizontally, laterally across the sidewalls of the intermediate section housing. The intermediate section rollers have a generally hyperboloid shape presenting a concave shape for support of the conveyor belt. During the forward run of the belt, the belt assumes a concave shape in conformance with the surface presented by the intermediate section rollers. The belt has a dished-in cross sectional profile which tends to keep the grain on the belt and permits carrying of a larger volume of grain per unit time. Less grain is prone to fall off the belt. The belt has no sharp bends by virtue of the even curvature of the roller surface resulting in a longer belt life. The rollers permit use of rectangular cross sectional shaped housing sections which in turn allow the use of externally mounted bearings to mount the roller shaft.

The self-reloading tail pulley mounted in the tail section includes a horizontally orientated shaft extending laterally across the tail section housing and having ends rotatably mounted in bearing blocks. A plurality of plates extend radially from the shaft. Each plate terminates in a circumferencially directed cured support lip pointed opposite the intended direction of rotation of the pulley. Paddles are mounted on the outward ends of some of the plates straddling the belt to sweep up grain which has fallen off the belt and accummulates in the tail section. They also sweep up grain which is scraped off of the bottom surface of the forward run of the conveyor belt by a scraper provided in the tail section just forward of the tail pulley. A tail pulley shroud surrounds the tail pulley and is operative to funnel grain swept up by the paddles on the tail pulley back onto the forward run of the conveyor belt as it leaves the tail pulley.

The tail section, intermediate sections and head section of the conveyor are preferably enclosed to isolate the traveling grain from weather conditions and to inhibit the spread of dust from the grain.

IN THE DRAWINGS

FIG. 1 is a top plan view of a conveyor assembly according to the present invention shown foreshortened;

FIG. 2 is a sectional view of the conveyor assembly of FIG. 1 taken along the line 2—2 thereof;

FIG. 10 is an enlarged side elevational view of the tail section of the conveyor assembly shown in FIG. 2;

FIG. 13 is a sectional view of the conveyor assembly tail section of FIG. 10 taken along the line 13—13 thereof;

FIG. 14 is a top plan view of a segment of the conveyor belt of the conveyor assembly; and FIG. 15 is an enlarged sectional view of the conveyor belt segment of FIG. 14 taken along the line 15—15 thereof.

DESCRIPTION OF PREFERRED EMBODIMENT

Figure 3:
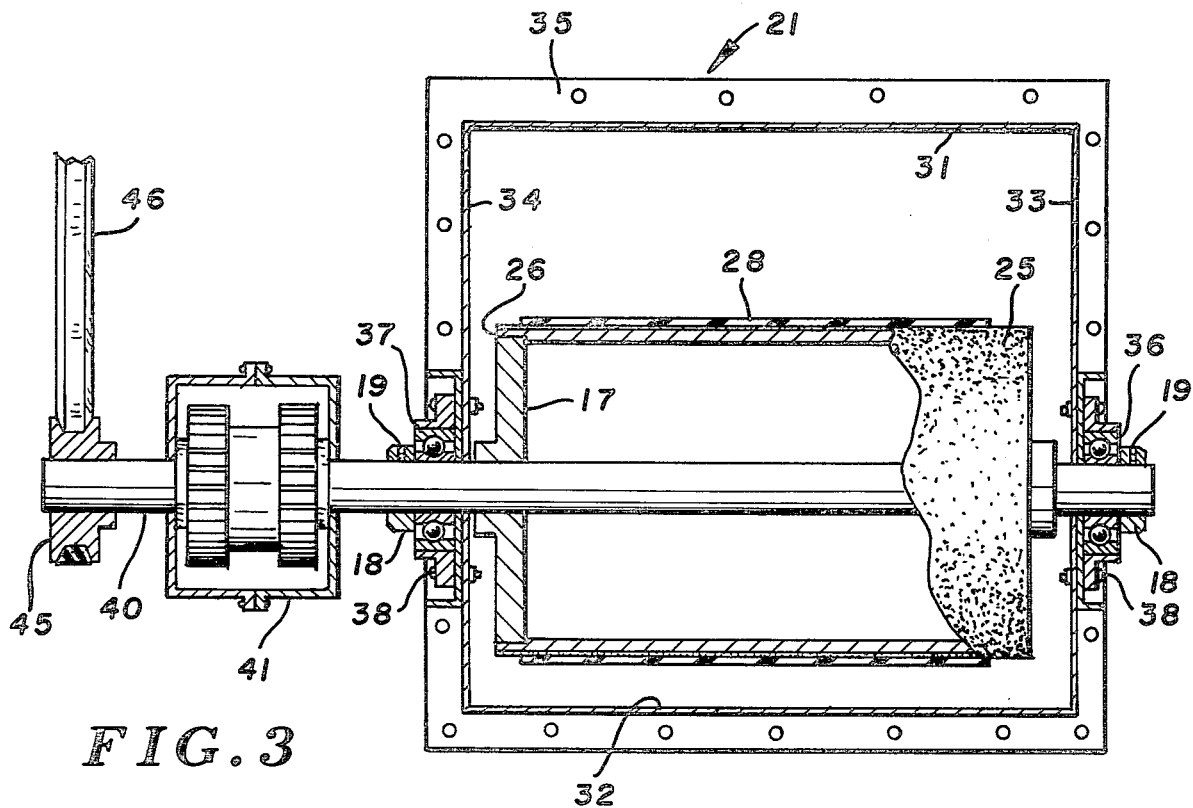
FIG. 3 is an enlarged sectional view of a portion of the conveyor assembly of FIG. 2 taken along the line 3—3 thereof.

Referring to the drawings, there is shown in FIGS. 1 and 2 and elongate conveyor assembly according to the present invention indicated generally at 20. Conveyor assembly 20 is formed of a plurality of sections forming a closed conveyor housing including a head section 21 at one end, a plurality of intermediate sections 23,23 according to the needed length of conveyor, and a tail section 24 at the opposite end of the conveyor assembly with respect to the head section 21. A drive pulley 26 is assembled in the head section 21 for rotation about a horizontal, transverse axis. An idler or tail pulley 27 is assembled in the tail section 24 for rotation about a horizontal, transverse axis. A flexible endless conveyor belt 28 is trained over the drive pulley 26 and the tail pulley 27. Drive pulley 26 can have a textured or abrasive surface 25 to assist in conveyor belt movement. Conveyor belt 28 has a forward run 28A extending from the top of tail pulley 27 moving forward to the top of drive pulley 26. The return run 28B of conveyor belt 28 extends from the bottom of drive pulley 26 rearward along the conveyor assembly 20 through the intermediate sections 22,23 to the bottom of tail pulley 27 to complete the conveyor belt cycle. As many intermediate sections 22,23 as are needed are assembled in conveyor assembly 20 according to the length of run required. Conveyor assembly 20 can carry grain long distances as from a grain drying location to a grain storage location and can carry a high volume of grain with a low amount of grain spillage over the edges of the forward run 28A.

Substantially all of the grain that is lost over the sides of the forward run of conveyor belt 28 is recovered in the tail section 24. Grain is moved along the top surface of the forward run of conveyor belt 28 in a forward longitudinal direction of travel to a discharge at head section 21. Grain is introduced through one or more hoppers 67 located in assembled relationship to one or more of the intermediate sections of the conveyor assembly. One or more drum type conveyor rollers 30 are mounted in each of the intermediate sections to carry and support conveyor belt 28 on its forward run.

Figure 4:
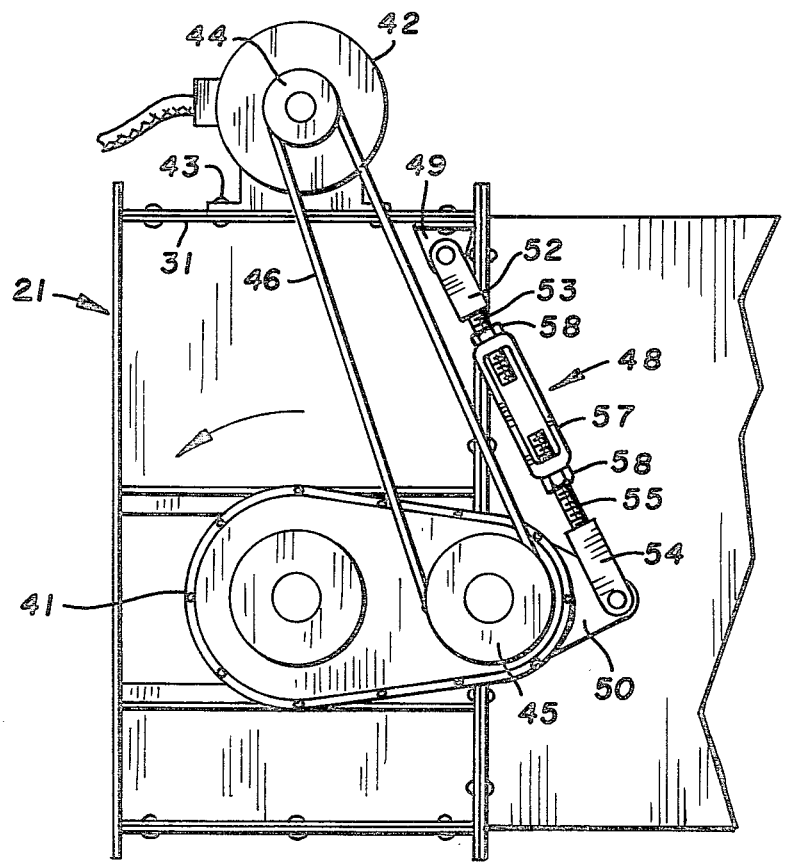
FIG. 4 is an enlarged side elevational view of a portion of the conveyor assembly of FIG. 1 taken along the line 4—4 thereof.

Head section 21 includes a standard box-like open ended housing comprised of top and bottom walls 31,32 and sidewalls 33,34 as shown in FIG. 3. A flange 35 is provided at the rearward wall edges for connection to the next section. Bearing assemblies 36,37 are mounted by bolts 38 in aligned recesses on the outsides of the sidewalls 33,34 and rotatably support a drive shaft 40 which carries the drive pulley 26 between the sidewalls 33,34. Drive pulley 26 is closed by end plates 17. Drive shaft 40 passes through central openings in the end plates 17 and through the bearing assemblies 36,37. Mounting collars 18 are fixed by set screws 10 on shaft 40 outboard of the bearing assemblies 36,37 to fix the position of drive shaft 40 and drive pulley 26. One end of drive shaft 40 extends beyond one of the sidewalls 34 and is assembled in a gear reduction, power transmission unit 41. Power means shown as an electric motor 42 in FIG. 4 is assembled by bolts 43 to the upper surface of top wall 31 and has a power output pulley 44. Transmission unit 41 has a power input pulley 45 drivably connected to power output pulley 44 by a drive belt 46. Tension in drive belt 46 is adjusted by means of a rigid, adjustable link 48 connected at one end to a lug 49 fastened to the lower surface of top wall 31, and at the other end to an outwardly extended arm 50 on transmission unit 41. Adjustable link 48 comprises a turnbuckle type assembly having a first yoke 52 assembled to the leg 49 with a threaded rod 53. A second yoke 54 is connected to the arm 50 of transmission unit 41 and has an oppositely threaded rod 55 directed toward the first threaded rod 53. A connector 57 is threadably engaged at one end to the first rod 53 and at the opposite end to the second threaded rod 55 of second yoke 54. Rotation of the connector 57 in one direction is effective to pull the first and second yokes 52,54 toward one another, and rotation of the connector in the opposite direction is effective to move the first and second yokes 52,54 away from one another thus to vary the distance between the power output pulley 44 of electric motor 42 and the power input pulley 45 of transmission unit 41 and set the correct tension on drive belt 46. Operation of electric motor 42 is effective to rotate drive shaft 40 through transmission unit 41 and thus rotate drive pulley 26 to move conveyor belt 28 along the length of conveyor assembly 20.

Figure 5:
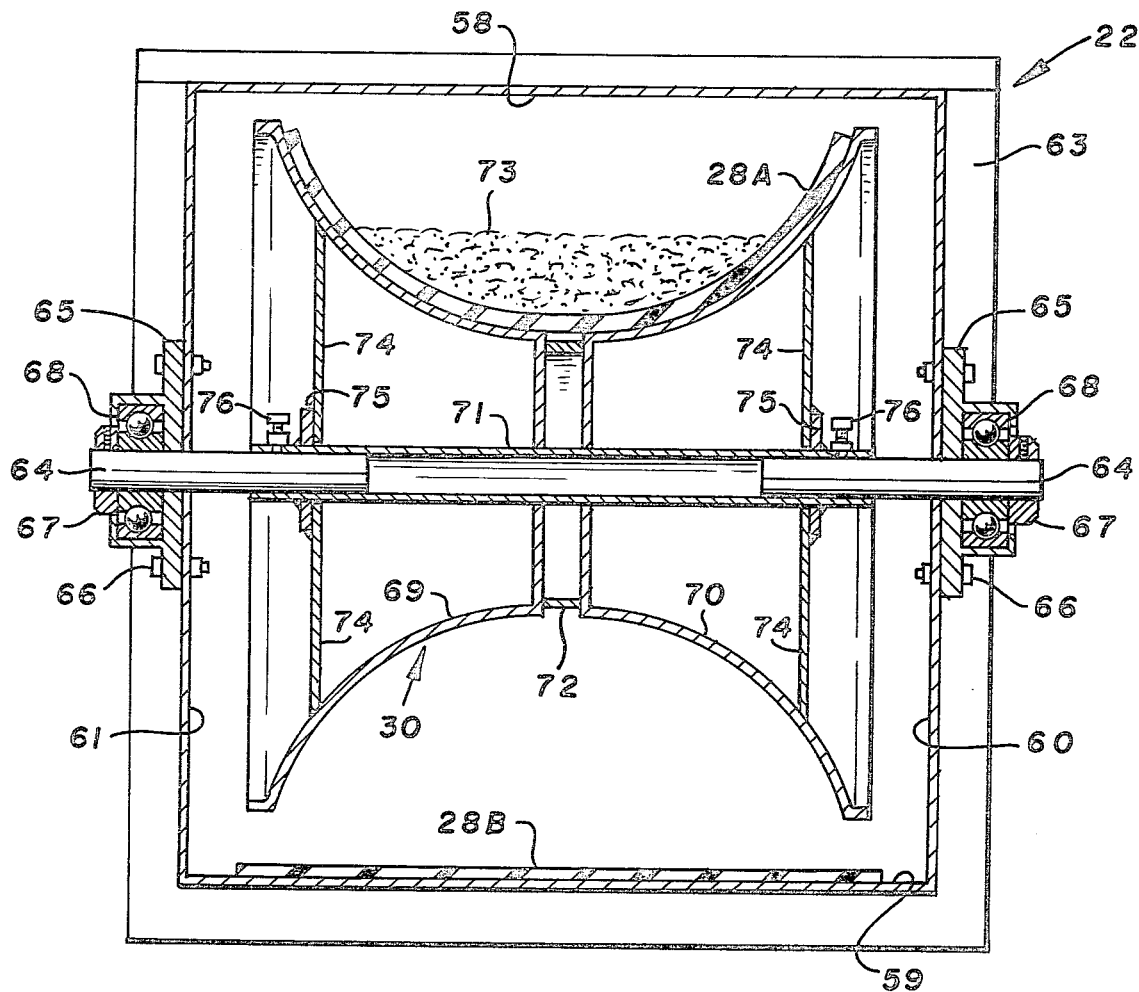
FIG. 5 is an enlarged sectional view of a portion of the conveyor assembly of FIG. 2 taken along the line 5—5 thereof.

As shown in FIG. 5, intermediate section 22 includes an open ended, rectangular box-like housing comprised of top and bottom walls 58,59 and sidewalls 60,61. The width of section 22 is preferably just wider than conveyor belt 28 at return run 28B so that spilled grain is moved rearward by return run 28B. Either end of the intermediate section 22 is circumscribed by a flange, as the flange 63, for connection to the next adjacent conveyor assembly section. One or more hoppers 67 are provided on the intermediate sections for introduction of material to the conveyor belt 28.

Use of drum type rollers 30 to carry the forward run 28A of belt 28 permits use of the rectangular cross-sectional shaped section housing. The vertical sidewalls are not prone to retain grain dust and other particles. Each roller 30 is carried on a pair of laterally orientated, horizontal roller shafts 64 having ends extended through suitable openings in the sidewalls 60,61. Bearing blocks 65 are mounted by nut and bolt combinations 66 to the outside of sidewalls 60,61 and carry bearing assemblies 69. Opposite ends of the roller shafts 64 are accommodated in bearing assemblies 68 for rotation therein to permit rotation of roller 30. External mounting of the bearing blocks 65 is permitted by the rectangular cross-sectional shape of the section housing. Grease and oil from the bearings do not contaminate the grain. The bearings are removed from the grain dust environment to reduce the chance of fire or explosion as by sparks from the bearings. In addition, bearing maintenance is facilitated and the shafts are accessible for inspection.

Figure 6:
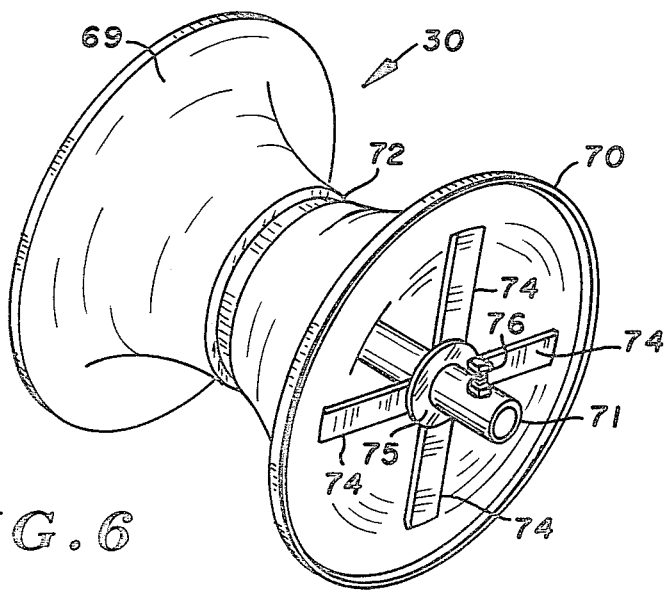
FIG. 6 is a perspective view of one of the intermediate section rollers of the conveyor assembly of FIG. 1.
Figure 7:
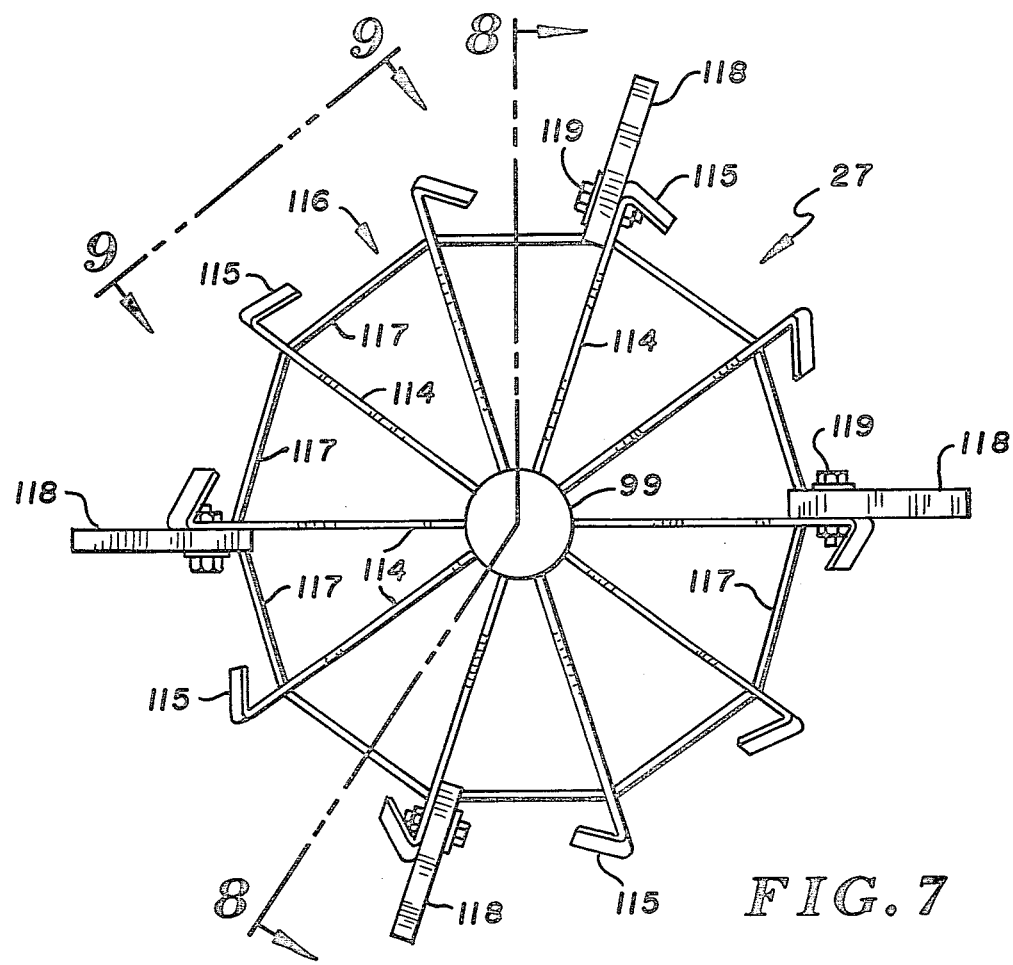
FIG. 7 is an enlarged side elevational view of the tail pulley of the belt conveyor assembly shown in FIG. 2.

As shown in FIG. 6, roller 30 has a reduced diameter mid section having a generally hyperboloid shape or shape like that of a pair of juxaposed truncated bell segments joined at their narrower ends. Referring to FIG. 5, drum 30 includes a first truncated bell segment 69 and a second truncated bell segment 70 joined by a spacer 72 at their narrower or constricted ends. The outside surface of roller 30 presents a laterally concave profile for accommodation of the forward run 28A of conveyor belt 28. As shown in FIG. 5, the cross sectional profile of the forward run 28A of the conveyor belt assumes a concave dish shape for accommodation of grain indicated at 73. The raised outer edges of the conveyor belt, following the contour of the surface of roller 30, inhibit loss of grain during the forward run of the conveyor belt and permit carrying of a larger volume of grain. Spacer 72 can be made longer or shorter as the need may be for accommodation of varying conveyor belt widths.

Bell sections 69,70 are hollow for purposes of economy and are connected to an axial tubular shaft mount tube 71 by spokes 74. Washer-like rings 75 are fastened as by welding on mounting tube 71 within the volume encompassed by bell sections 69,70. Spokes 74 are fixed at one end to each washer-like ring 75 and extend radially outward therefrom to the point of intersection with the interior surface of the truncated bell sections 69,70. The outer ends of spokes 74 are fastened to the interior surfaces of the bell sections by suitable means such as welding. The interior ends of roller shafts 64 are engaged in the respective ends of mounting tube 71 removably held in place by set screws 76. The support rollers of the remaining sections of conveyor assembly 20 are like the roller 30 of intermediate section 22 such that the dish shaped profile of forward run 28A of conveyor belt 28 is maintained continuous throughout the length of the conveyor assembly.

Referring to FIGS. 10 through 13, tail section 24 includes top and bottom walls 77,78 and sidewalls 79,80. A removable cover 82 is fitted over a flanged opening 83 in the top wall 77. Tail pulley 27 is assembled in tail section 24 with endless conveyor belt 28 trained over it. The rearward end of tail section 24 is closed by an end wall 84 assembled by nut and bolt assemblies 85 to an end flange 86 which circumscribes the rear edges of top and bottom walls 77,78 and sidewalls 79,80. The forward end of tail section 24 is open and has a circumscribing flange 87 to abut and fasten to the flange of the next adjacent intermediate section 23 of conveyor housing 20.

As shown in FIG. 13, tail pulley 27 is mounted on a transverse tail pulley shaft 99. Longitudinal openings 100A and 100B are provided in symmetrical, oppositely disposed relationship in sidewalls 78,80 of tail section 24. Longitudinal slidable mounting plates 90 cover the openings 100. A retaining strip 88 is mounted adjacent the upper edge of each of the openings 100A, 100B, and a second downwardly overlapping retaining strip 89 is mounted on each retaining first strip 88 to provide an upper track for the upper edge of each of the mounting plates 90. An angled bar 92 is mounted adjacent the lower edge of each of the openings 100A, 100B. A lower, outwardly directed lip 91 is secured to the lower edge of each of the mounting plates 90 and rides on the angled bar 92 to provide a lower track for the lower edge of each of the mounting plates 90.

The outer ends of the tail pulley shaft 99 are rotatably mounted in bearing assemblies 96 which are fastened to the mounting plates 90. Each outer end of the tail pulley shaft 99 extends through a suitable opening provided in the respective mounting plate 90, through bearing assembly 96 and then through a mounting collar 97. A suitable set screw 98 is provided on each mounting collar 97 to fix the relative position of the respective ends of the tail pulley shaft 99.

Figure 11:
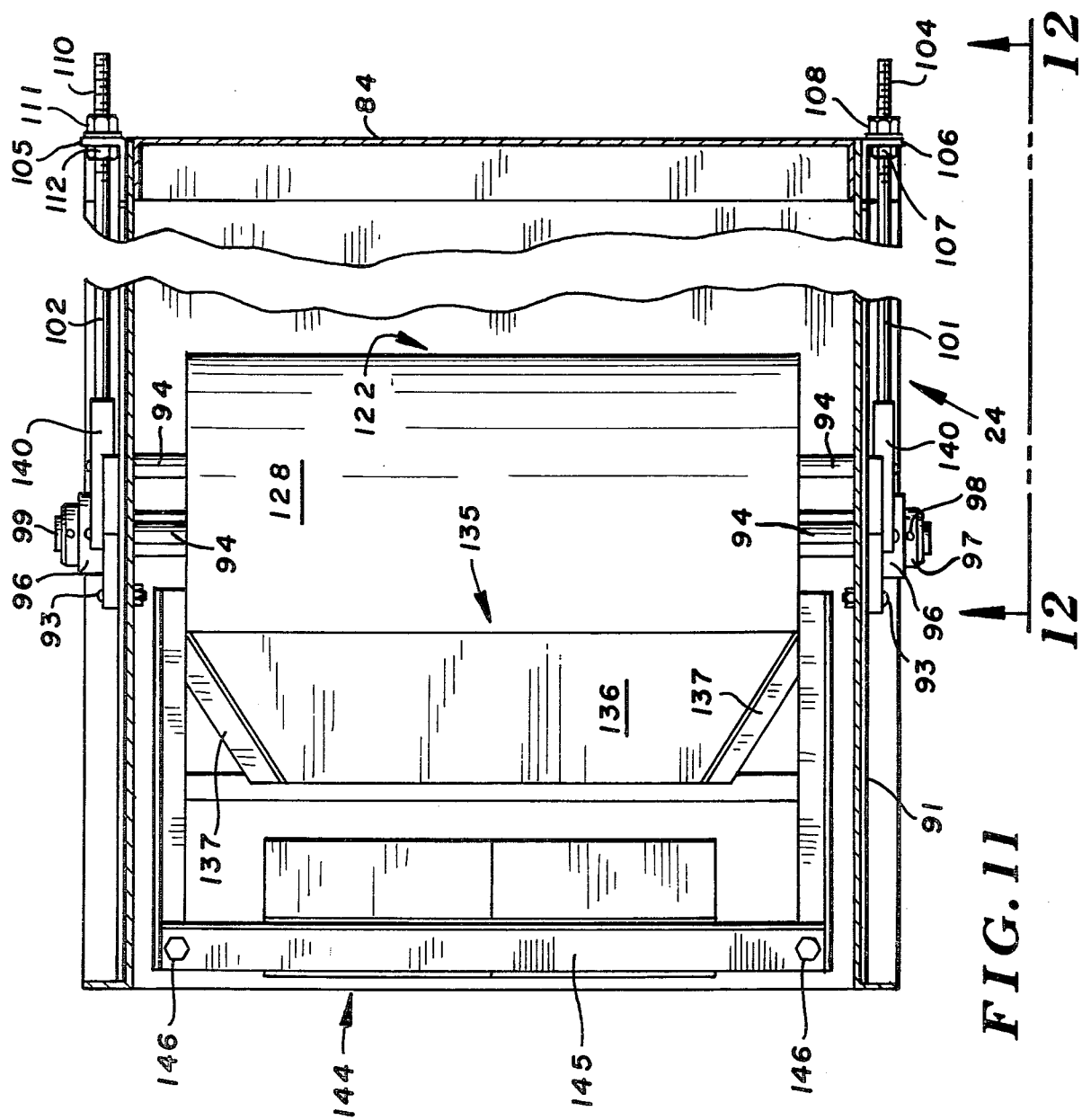
FIG. 11 is a sectional view of the conveyor assembly tail section shown in FIG. 10 taken along the line 11—11 thereof.

As shown in FIGS. 10 and 11, a pair of horizontal, longitudinal adjusting rods 101,102 are used to fix the longitudinal position of tail pulley 27 in tail section 24. Adjusting rods 101,102 are located outside of the sidewalls 79,80 of tail section 24. A pair of brackets 105,106 extend laterally from either side of the rear end of tail section 24. The adjusting rod 101 passes through the bracket 106 at one end and is fastened at the other end to a yoke 140 which is fastened to the corresponding bearing assembly 96 (see FIG. 12). The rearward end 104 of adjusting rod 101 that passes through the bracket 106 is threaded and locknuts 107,108 are provided on either side of the bracket 106. The nuts 107,108 can be loosened to permit adjustment of the longitudinal position of adjusting rod 101 and thus of bearing assembly 96, tail pulley shaft 99 and tail pulley 27. In similar fashion, rearward end 110 of the second longitudinal adjusting rod 102 is threaded and passes through bracket 105. The forward end is connected at the other end to a yoke 140 which is connected to the other bearing assembly 96. A second set of locknuts 111 and 112 are disposed on threaded end 110 of adjusting rod 102 on either side of bracket 105. These locknuts can be loosened along with the first set of locknuts 107,108 wherein the longitudinal position of the tail pulley 27 is adjustable. The horizontal position of the adjusting rods 101,102 is adjusted to the position where the proper tension is achieved on the conveyor belt 28 trained over the tail pulley 27. This is accomplished by forward or rearward movement of the rods as the need may be. When the proper position is achieved or when the correct tension is set in conveyor belt 28, the locknuts 107,108,111,112 are tightened.

Figure 8:
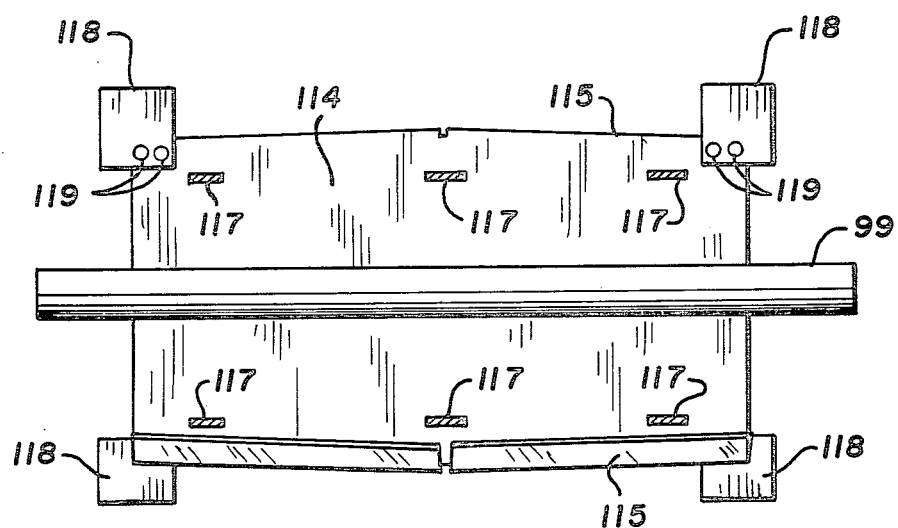
FIG. 8 is a sectional view of the tail pulley of FIG. 7 taken along the line 8—8 thereof.
Figure 9:
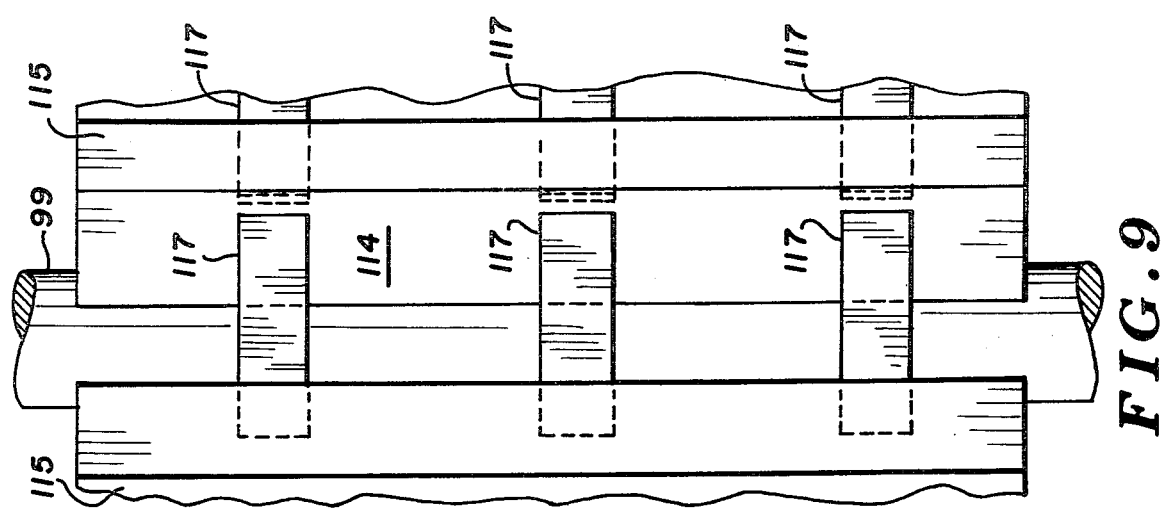
FIG. 9 is an enlarged end plan view of a portion of the tail pulley of FIG. 7 taken along the line 9—9 thereof.

Referring to FIGS. 7 through 10, self-reloading tail pulley 27 is comprised of a plurality of plate-like support members or spokes 114, each assembled at an inward end to the tail pulley shaft 99 and extending radially outward therefrom. At the radially outward end of each support 114 is a circumferencially directed curved support lip 115 pointed opposite the intended direction of rotation of tail pulley 27 providing a support base for holding the conveyor belt 28. As shown in FIG. 8, the upper support edge formed by the lip 115 is crowned to assist in maintaining and centering conveyor belt 28 on pulley 27. A plurality of pulley rims 116 support the support members in their relatively spaced circumferencial orientation. Each rim 116 is formed of a plurality of circumferencially aligned, straight rim segments 117 fastened between the support members 114 toward their outer ends. Rim segments 117 can be welded or otherwise suitably fastened between the support members 114 at a location just radially inward from the lips 115.

Flexible paddles 118 are fastened to selected support members 114 in order to sweep dispersed grain and dust upon rotation with tail pulley 27. As shown in FIG. 8, the paddles 118 are located at lateral ends of the upper or outer edge of support member 114 in order to straddle the conveyor belt 28 riding over the edges of support members 114 presented by lip 115. Paddles 118 extend radially outward from the outward edge of the support member 114 and are fastened thereto by nut and bolt assemblies 119. Paddles 118 have a generally rectangular shape and can be made of rubber, plastic or the like flexible material.

A tail pulley shroud 122 houses tail pulley 27 and cooperates with the paddles 118 to keep the tail section 24 clean and free of dispersed and spilled grain and dust. Shroud 122 includes a generally semi-cylindrical housing 123 with a bottom wall 124 extending from a location forward of tail pulley 27 beneath the return run of conveyor belt 28 to a location behind tail pulley 27. Perpendicular sidewalls 125 extend upwardly from either edge of the bottom wall 124 to partially encapsulate the lower portion of tail pulley 27 and the return run 28B of conveyor belt 28 as it travels onto the tail pulley 27. Bottom wall 124 of housing 123 merges into a curved rearward wall 127 and then to a top wall 128. As shown in FIGS. 2 and 10, sidewall 125 curves along with the rear wall 127 and top wall 128 of housing 123 leaving an opening on either side for extension of the ends of the tail pulley shaft 99. Sidewall 125 and lower wall 124, rearward wall 127 and top wall 129 substantially encapsulate the top, rear and bottom portions of tail pulley 27 as well as the return run 28B of conveyor belt 28 as it wraps onto tail pulley 27, and the initial forward run 28A of conveyor belt 28 as it leaves tail pulley 27.

Figure 12:
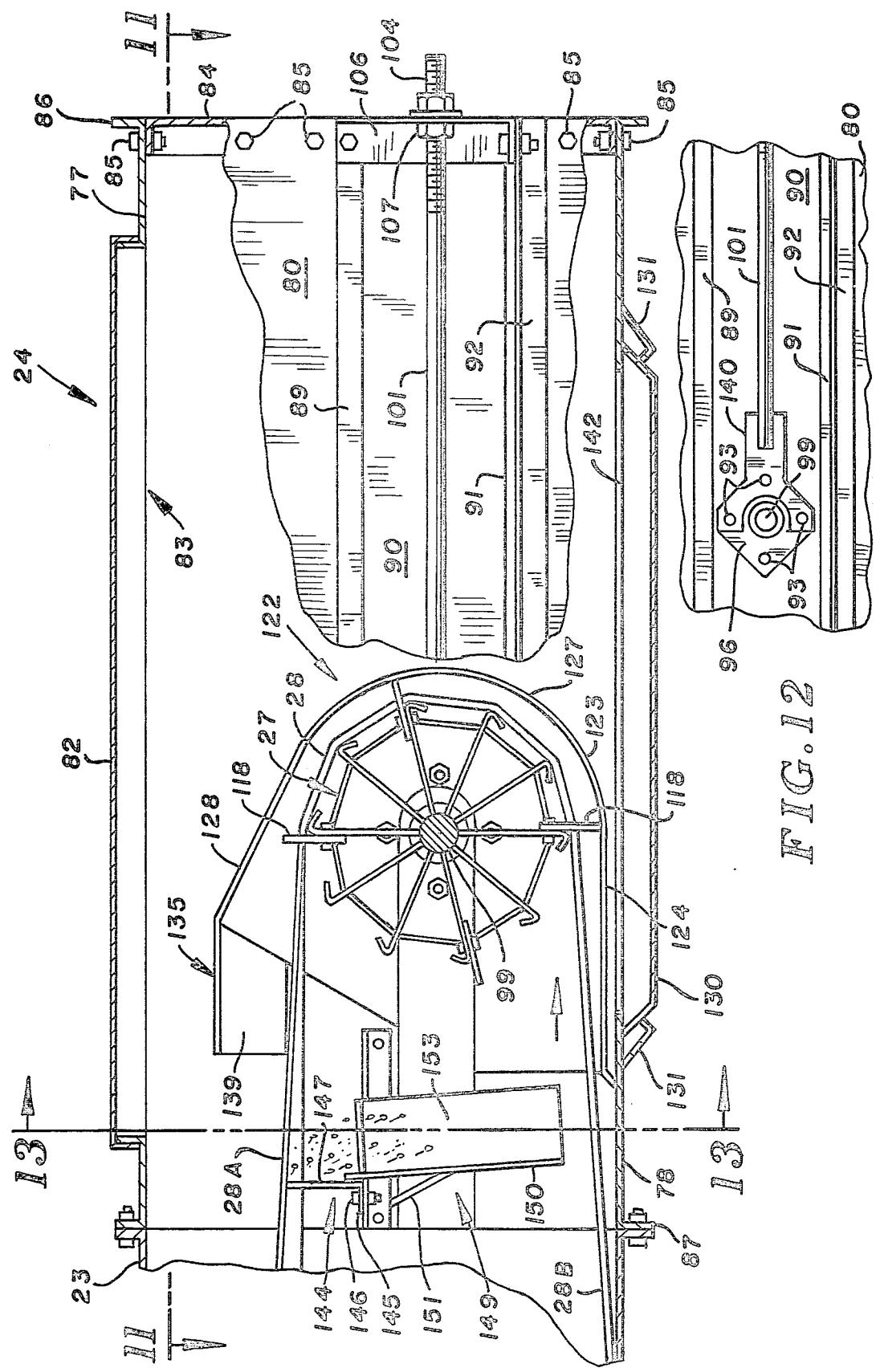
FIG. 12 is a fragmentary side elevational view of a portion of the conveyor assembly showing the adjustable mount structure of the tail pulley.

Tail pulley shroud 122 is supported in tail section 24 for longitudinal movement with tail pulley 27. As shown in FIGS. 12 and 13, a plurality of bolts 93 pass through the outer periphery of bearing assembly 96, through the mounting plate 90 and through the sidewall 125 of tail pulley shroud 122 on either side thereof. Nuts 95 secure the inward ends of the bolts 93, and a spacer 94 extends between the mounting plate 90 and the sidewall 125 of tail pulley shroud 122 whereby tail pulley shroud 122 is secured for longitudinal movement along with the tail pulley 27.

Tail pulley shroud 122 includes a chute 135 having a funnel-shaped outlet to direct grain carried through the shroud housing 123 back onto the forward run 28A of conveyor belt 28. A chute top wall 136 is connected along the forward edge of housing top wall 128. The outer edges of chute top wall 136 converge away from housing top wall 128. Chute sidewalls 137 extend downwardly from the converging outer edges of chute top wall 136 and with the chute top wall 136 form a funnel-shaped outlet opening 139 disposed above the initial portion of the forward run 28A of conveyor belt 28. The chute sidewalls 137 converge sufficiently such that the outlet 139 has a width no greater than the width of the conveyor belt 28.

As shown in FIGS. 2 and 10, a scraper bar 144 is located ahead of tail pulley shroud 122. Bar 144 is a right angle member having a flat horizontal leg 145 extended between sidewalls 79,80 of tail section 24 and a vertical scraper leg 147 extended upward from the horizontal leg 145. Leg 147 has an upper edge positioned in scraping contact with the lower surface of forward run 28A of conveyor belt 28 as it leaves the tail pulley 27. Nut and bolt assemblies 146 connect opposite ends of bar 144 to supports 148 attached to sidewalls 79 and 80. The purpose of scraper bar 144 is to scrape and remove grain from the lower surface of forward belt run 28A that may have previously spilled on the upper surface of the return belt run 28B and remained thereon while rounding tail pulley 27. A deflector unit 149 includes a generally vertical base 150 secured to scraper bar 144 by strut 151. Deflector plates 153 are secured to base 150. Deflector plates 153A and 153B are angularly orientated as shown in FIG. 13 meeting at an upper apex centrally aligned with belt 28 and diverging downwardly therefrom. Lower edges of deflector plates 153A and 153B straddle conveyor belt return run 28B. Material scraped from the lower surface of the conveyor belt forward run 28A falls on deflector plates 153A,153B and is carried to a location on either side of conveyor belt return run 28B. The deflector plates 153A and 153B prevent material from falling back onto the return belt run 28B and direct it to a vicinity to be engaged by paddles 118.

Due to slack in belt 28, the return belt run 28B for most of its length slides along the bottom wall 59 of the intermediate section. This belt movement is effective to move accumulated, spilled grain rearwardly toward tail section 24 along with grain which is scraped by scraper bar 141 from the lower surface of forward run 28A. When the grain moves into the tail section shroud housing 123, it is eventually picked up by paddles 118 rotating with the tail pulley 27. Paddles 118 move the grain up and around the rear of the housing 123 and then forward to the shroud chute 135. It is discharge through the outlet opening 139 back onto the forward run 28A of conveyor belt 28. The bottom wall 78 of tail section 24 has an access and clean-out opening 142 closed by a gate or door 130 mounted on track members 131.

Conveyor belt 28 has ends joined together at a transverse seam 154 shown in FIG. 14, formed of interlocking, pin connected metal members hinged together for purposes of flexibility. In order that seam 154 will not cause damage to the bottom walls of the intermediate sections as it rides over them, a plurality of flaps 155 are provided for covering the seam 154. Flaps 155, shown in FIGS. 14 and 15, are of a belt like material and are connected to one of the ends as by rivets 156 at one end. The opposite end of the flap 155 extends over the seam 154 orientated to be in trailing relationship as the lower run 28B moves over the bottom walls of the intermediate sections. A plurality of the flaps 155 are provided sufficiently to permit curvature of the belt section in order that it can assume the curvature provided by the intermediate section rollers 30.

While there is shown and described one embodiment of the material conveyor it is understood that changes in structure, size of structures and components, materials and use of the conveyor can be made by one skilled in the conveyor art without departing from the invention. The invention is defined in the following claims.

I claim:
1. A conveyor assembly for conveying material along a forward longitudinal path of travel, comprising:
   a head section having a head section pulley assembled for rotation about a horizontal lateral axis;
   a tail section having a tail pulley assembled for rotation about a horizontal lateral axis;
   one pulley being a drive pulley and the other pulley being an idler pulley;
   a plurality of intermediate conveyor sections assembled between the head section and the tail section;
   an endless flexible conveyor belt trained longitudinally over the head section pulley and the tail pulley and extending through the intermediate section and having an upper forward run from the tail pulley to the head section pulley, and a lower return run from the head section pulley to the tail pulley;
   a plurality of conveyor belt rollers assembled in said intermediate sections for rotation about horizontal, lateral axes and positioned to carry a portion of the forward run of the conveyor belt, each said roller having a laterally concave surface whereby the conveyor belt forward run assumes a lateral concave profile as it travels over the roller to assist in maintaining material on the conveyor belt forward run;
   said head section pulley comprising the drive pulley, said tail pulley comprising the idler pulley, and including a tail pulley shroud having a shroud housing substantially enclosing the tail pulley and the rear portion of the conveyor belt forward run and the rear portion of the conveyor belt return run, said tail pulley having a plurality of paddles mounted in straddling relationship to the conveyor belt traveling over the tail pulley and extending radially outward thereof, said shroud having a funnel-shaped outlet opening directed toward the rear portion of the forward run of the conveyor belt, said paddles positioned to sweep accumulated spilled material from the lower portion of the shroud housing to the upper portion and then through the outlet to discharge it on the forward run of the conveyor belt.

2. The conveyor assembly of claim 1 including: a scraper bar mounted in the tail section ahead of the tail pulley and having a scraper leg in scraping contact with the lower surface of the forward run of the conveyor belt, and a deflector unit mounted behind the scraper unit operable to deflect material scraped by the scraper bar laterally away from the conveyor belt return run.

3. The conveyor assembly of claim 2 wherein: said deflector unit includes a pair of plates assembled in an inverted V configuration with lower ends in straddling relationship to the return run of the conveyor belt.

4. A conveyor assembly for conveying material along a forward longitudinal path of travel, comprising:
   a head section having a head section pulley assembled for rotation about a horizontal lateral axis;
   a tail section having a tail pulley assembled for rotation about a horizontal lateral axis;

one pulley being a drive pulley and the other pulley being an idler pulley;

an intermediate conveyor section assembled between the head section and the tail section;

an endless flexible conveyor belt trained longitudinally over the head section pulley and the tail pulley and extending through the intermediate section and having an upper forward run from the tail pulley to the head section pulley, and a lower return run from the head section pulley to the tail pulley;

a conveyor belt roller assembled in said intermediate section for rotation about a horizontal, lateral axis positioned to carry a portion of the forward run of the conveyor belt, said roller having a laterally concave surface whereby the conveyor belt forward run assumes a lateral concave profile as it travels over the roller to assist in maintaining material on the conveyor belt forward run; and housing means located adjacent the tail pulley for directing material from adjacent the bottom of the tail pulley to the top of the belt, and paddles means mounted on the tail pulley for moving material from adjacent the bottom of the tail pulley to the top of the belt.

5. A conveyor assembly for conveying material along a forward longitudinal path of travel, comprising:

a head section having a drive pulley assembled for rotation about a horizontal lateral axis;

a tail section having a tail pulley assembly for rotation about a horizontal lateral axis;

at least one intermediate conveyor section assembled between the head and the tail section;

an endless, longitudinal flexible conveyor belt trained over the drive pulley and trained over the tail pulley and extending through the intermediate section and having an upper forward run from the tail pulley to the drive pulley, and a lower return run from the drive pulley to the tail pulley;

a tail pulley shroud having a shroud housing enclosing the tail pulley and the rear portion of the conveyor belt forward run and the rear portion of the conveyor return run, said tail pulley having a plurality of paddles mounted in straddling relationship to the conveyor belt portion trained over the tail pulley and extending radially outward thereof, said shroud having a funnel-shaped outlet opening directed toward the rear portion of the forward run of the conveyor belt, said paddles positioned to sweep accumulated spilled material from the lower portion of the shroud housing up to the upper portion and then through the outlet to discharge it on the forward run of the conveyor belt.

6. The conveyor assembly of claim 5 wherein: said tail section includes a pair of sidewalls and a bottom wall enclosing the shroud, longitudinal horizontal tail section guide rails assembled to said sidewalls, said tail pulley being mounted on a tail pulley shaft, the outer ends of said tail pulley being assembled to bearing blocks, said bearing blocks being mounted for longitudinal movement on said guide rails and including means to adjust the position of tail pulley shaft bearing blocks to set tension of the conveyor belt.

7. The conveyor assembly of claim 6 wherein: the rear of the tail section is closed by an end plate, said means to adjust the position of the tail pulley shaft bearing blocks including a pair of longitudinal rods, one each of said rods being threaded at one end into a bearing block and extending rearwardly therefrom through openings in said end wall, and including lock nuts on the rearward ends of the rods to fix preselected position of the rods.

8. The conveyor assembly of claim 7 including: horizontal, longitudinal shroud housing guide rails mounted on the shroud housing and riding on the bearing blocks to permit adjustment of the position of the shroud housing with respect to the tail pulley, and including means on the shroud housing for cooperation with the rods to fix the position of the shroud housing with respect to the tail pulley.

9. The conveyor assembly of claim 8 including: a scraper bar mounted in the tail section ahead of the tail pulley and having a scraper leg in scraping contact with the lower surface of the forward run of the conveyor belt, and a deflector unit mounted behind the scraper unit operable to deflect material scraped by the scraper bar laterally away from the conveyor return run.

10. The conveyor assembly of claim 9 wherein: said deflector unit includes a pair of plates assembled in an inverted V configuration with an apex centrally aligned with the conveyor belt and with lower ends in straddling relationship to the return run of the conveyor belt.

* * * * *

UNITED STATES PATENT AND TRADEMARK OFFICE
CERTIFICATE OF CORRECTION

PATENT NO. : 4,230,222
DATED : October 28, 1980
INVENTOR(S) : Philip G. Clark

It is certified that error appears in the above-identified patent and that said Letters Patent are hereby corrected as shown below:

Column 2, line 49, "23,23" should be --22,23--.

Column 3, line 28, "10" should be --19--.

Signed and Sealed this

Seventeenth Day of February 1981

[SEAL]

Attest:

RENE D. TEGTMEYER

Attesting Officer

Acting Commissioner of Patents and Trademarks